United States Patent

McNally

[15] 3,674,290

[45] July 4, 1972

[54] COUPLING

[72] Inventor: Sellers B. McNally, Homewood, Ill.

[73] Assignee: Maremont Corporation, Chicago, Ill.

[22] Filed: May 4, 1970

[21] Appl. No.: 34,099

[52] U.S. Cl. .......................... 285/248, 285/375, 285/DIG. 22
[51] Int. Cl. ............................................................ F16l 33/18
[58] Field of Search ................. 285/248, 249, 250, 267, 375, 285/379, 380, DIG. 22

[56] References Cited

UNITED STATES PATENTS

| | | | |
|---|---|---|---|
| 3,193,310 | 7/1965 | Hildner | 285/248 X |
| 1,297,370 | 3/1919 | Loomis | 285/267 |
| 2,391,885 | 1/1946 | De Shields | 285/375 X |
| 3,133,777 | 5/1964 | Anhalt | 285/DIG. 22 |
| 1,099,129 | 6/1914 | Robinson | 285/379 X |

*Primary Examiner*—Thomas F. Callaghan
*Attorney*—Cushman, Darby & Cushman

[57] ABSTRACT

A coupling for use in attaching flexible tubing to suspension elements or other devices in which the tubing is reinforced by a rigid member which prevents collapse of the tubing and in which a seal is resiliently compressed between two relatively rigid members to improve the sealing ability of the coupling under extreme environmental operation conditions.

7 Claims, 6 Drawing Figures

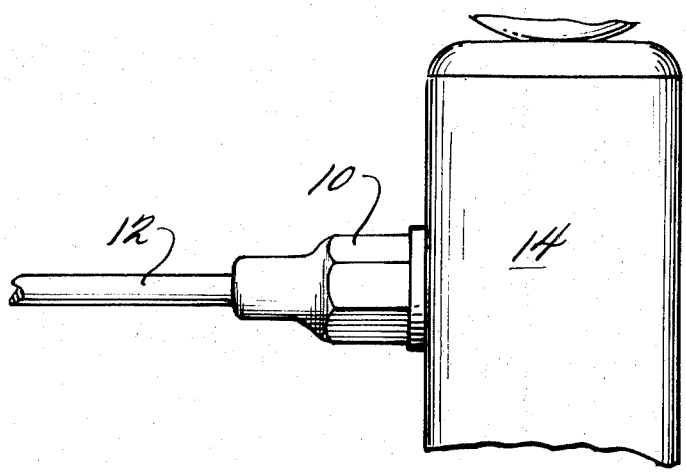
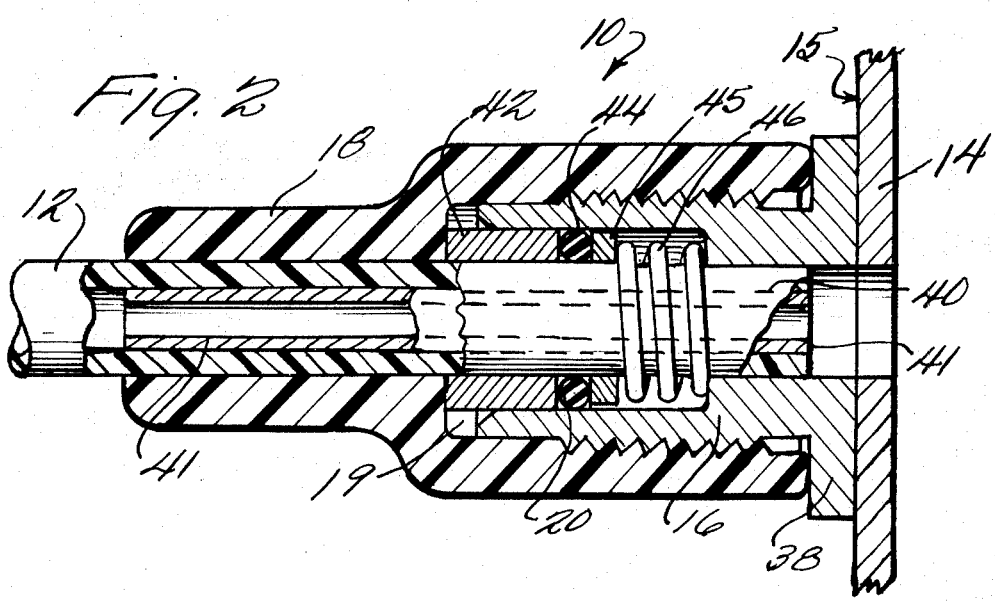
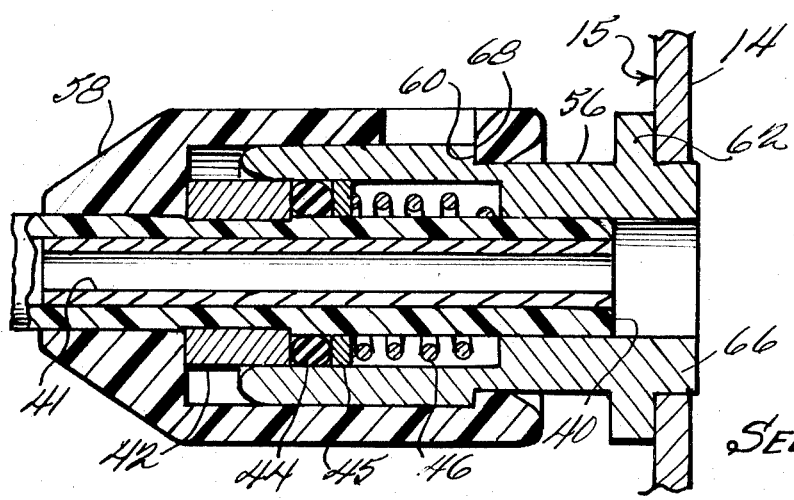
INVENTOR
SELLERS B. MCNALLY
BY Cushman, Darby & Cushman
ATTORNEYS

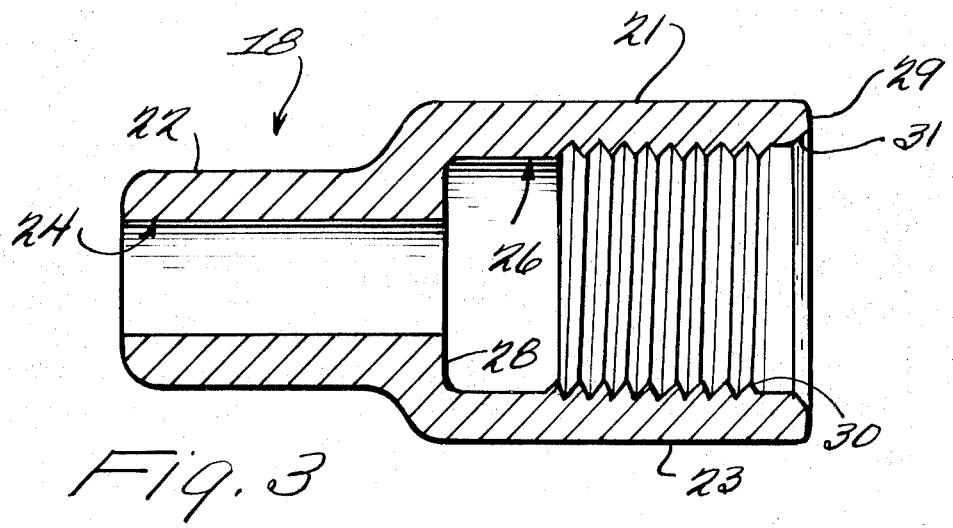
Fig. 3
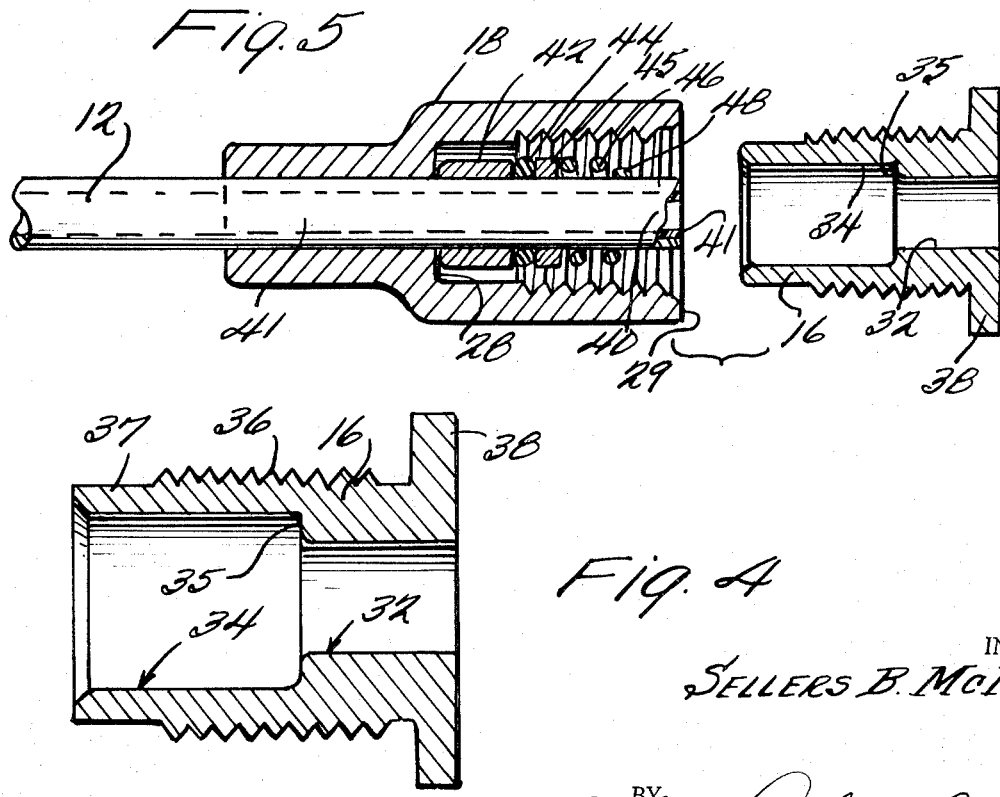
Fig. 5
Fig. 4
INVENTOR
SELLERS B. MCNALLY
BY Cushman, Darby & Cushman
ATTORNEYS

COUPLING

BACKGROUND OF THE INVENTION

A hydropneumatic vehicle suspension system is described in the patent to Broadwell, U.S. Pat. No. 3,083,026 of Mar. 26, 1963 as a suspension system having a high pressure reservoir for storing hydraulic fluid under pressure and a pump arranged to be actuated by relative movement between the sprung and unsprung masses of the vehicle, during its travel, to supply fluid under pressure to the reservoir. The high pressure fluid stored and maintained in the reservoir as a result of the travel of the vehicle is preferably utilized to maintain the unsprung mass of the vehicle in a predetermined vertical relation with respect to the unsprung mass, as by a self-leveling hydropneumatic strut.

In the installation of a hydropneumatic vehicle suspension system it is necessary to provide fluid communication in the form of tubular conduits between the various suspension elements of the system. By using a relatively flexible tubing which can be easily bent to the desired configuration, it has been found that these systems can be quickly and inexpensively installed in various types and models of road vehicles without the need of special tools or equipment.

Although the use of flexible tubing reduced the cost and difficulties in installing these systems, it was found that flexible tubing could not be connected to the suspension elements by use of conventional tube coupling because conventional tube couplings were not designed to function under the extreme operational conditions to which a hydropneumatic system is subjected. To provide an acceptable tube coupling for these suspension systems, the coupling must satisfy the following requirements:

1. The coupling must be leak free when subjected to continuous shock and flexing generated by the movement of the various elements of the suspension system over an uneven road surface.

2. The coupling must be easy to initially install but be removable so that the system may be serviced or so that damaged tubing may be easily replaced.

3. The coupling must be able to provide an acceptable seal through enormous variations in operation temperature. This extreme variation is due to the vehicle being subjected to environmental temperature ranging from 0° F. to above 100° F. This temperature variation can be increased to values above 100° F. when the vehicle is operated on a hot road surface which radiantly heats the underside of the vehicle or when the frictional heat generated within the system is added to the above. It can also be seen that the system must be able to operate through a rapid change in temperature, such as when a vehicle has been allowed to stand in a cold atmosphere and is warmed up by starting the vehicle and operating it along a roadway.

4. The coupling must also be able to join relatively flexible tubing material without applying a damaging torque or twisting of the tubing.

5. The coupling must be able to prevent the flexible tubing from collapsing in the area of the coupling so that crimping of the tubing will not obstruct flow within the tubing.

6. The coupling seal must be reusable so that maintenance costs will be a minimum.

7. The coupling must provide means to limit loading of the seal beyond its maximum operational compression during installation.

8. The coupling must be easy and inexpensive to manufacture and install and cannot require the use of special tools to service or install.

It is, therefore, a purpose of this invention to provide a coupling for a flexible tubing which satisfies all of the above requirements.

BRIEF DESCRIPTION OF THE DRAWINGS

FIG. 1 shows a plan view of the present invention coupling a flexible tubing to a fluid reservoir;

FIG. 2 is a plan view partially in section illustrating the coupling shown in FIG. 1;

FIG. 3 is a sectional view of the female fitting shown in FIG. 2;

FIG. 4 is a sectional view of the male fitting shown in FIG. 2;

FIG. 5 is a sectional view of the coupling with the male and female fittings separated; and FIG. 6 is a plan view partially in section illustrating an alternate embodiment of the coupling.

DESCRIPTION OF THE PREFERRED EMBODIMENTS

Referring to the drawings wherein like reference characters designate like or corresponding parts throughout the several views, there is shown in FIG. 1, a coupling 10 connecting the end of a flexible tube 12 to a fluid suspension element 14 of a hydropneumatic vehicle suspension system. The tubing 12 could be made from any flexible material but it has been found that nylon materials are acceptable for use in hydropneumatic systems because the nylon tubing is sufficiently flexible and adequately resists the abrasion to which the tubing is subjected. Although the tube 12 is shown as being attached directly to a fluid element, it should be understood, that the coupling 10 of the present invention could be used to attach flexible tubing to other types of devices or fitting in which a coupling with the improved operational characteristics of the present invention are required.

FIG. 2 illustrates an enlarged sectional view of the coupling 10, assembled from a male fitting 16 and a female fitting 18. A cavity 19 is formed between the male and female fittings and enclosed within this cavity is a seal assembly whose operation will be hereinafter described. The male fitting 16 is shown as being resistance welded to the suspension element 14 on a flat mounting surface 15, by methods currently well known in the art. Although this connection is shown as being welded it is foreseen that other methods of attachment could be used.

Referring now to FIG. 3, wherein an enlarged sectional view of the female fitting 18 is shown. This fitting 18 can be constructed from durable plastic material and formed with an enlarged end 21 and a reduced end 22. The exterior of this enlarged end 21 is provided surfaces 23 for use in gripping the member by a tool during assembly of the coupling. These surfaces 23 can be any form known in the art such as a hexagonal or square cross section. A bore 24 is provided through the center of the female fitting 18 and is of such a size as to allow the insertion of the tubing 12 therethrough. This bore 24 should be of sufficient size to allow the female fitting 18 to easily slide axially along the tube 12. A counterbore 26 is formed in the enlarged end of the fitting 18 and is axially aligned with the center bore 24. Formed at the bottom of this counterbore 26 is an inner radial surface 28. An outer radial surface 29 is formed between the outer portion of the counterbore and the enlarged end 21. Internal threads 30 are provided on a portion of the counterbore 26 near the enlarged end 21. The counterbore 26 is also counter sunk at 31 on the enlarged end 21.

Referring to FIG. 4, wherein an expanded sectional view of the male coupling 16 is shown as having a central bore 32 therethrough. This bore 32 is of such a size as to allow the insertion of the tubing 12 therethrough and can be identical in diameter with the bore 24 in the female member. A counterbore 34 is provided in one end of the fitting and is axially aligned with the bore 32. An internal shoulder 35 is formed in the bottom of the counterbore 34 between the counterbore 34 and the bore 32. External threads 36 are provided on a portion of the exterior of the male fitting 16 and are of such a size and pitch as to mate with the internal threads 30 on the female fitting 18 as shown in FIG. 2. At one end of these threads 30 is an unthreaded portion 37 and at the other end is an annular stop or shoulder 38, whose function will later be described.

By referring to FIGS. 2 and 5 the assembly of this coupling will be described. First, the tubing 12 is inserted through the female fitting 18 so that one end 40 extends through the counterbore 26 and beyond the end of the fitting 18. A reinforcement member 41 in the form of a stiff hollow tube is inserted into the interior of the extending end 40 of the tube 12. This reinforcement member is of a sufficient length to extend along the length of the coupling 10 and can be made of any material either plastic or metal which is rigid enough to prevent the flexible tube 12 from collapsing in any portion of the coupling.

A band 42 is then slipped onto the exterior of the extending tube end 40 and is swaged or crimped in place to bind the wall of the tube 12 between the interior of the band 42 and the exterior of the reinforcing member 41. The band 42 can be made of any material which can fit around and squeeze the relatively soft material of the tube 12 in a vise like grip. The female fitting 18 is then moved axially along the tube 12 until the band 42 contacts the inner radial surface 28 and limits the movement of the fitting 18 in a direction toward the extending end 40.

The O-ring type seal 44 of sufficient size and diameter to seal between the exterior surface of the tube 12 and the interior of the counterbore 34, is slipped over and axially along the extending end 40 until it abuts against the metal band 42. A washer 45 is then inserted over the extended end 40 and slid axially along it until it contacts the seal member 44, so that, the seal 44 is held between the washer 45 and the metal band 42. The washer 45 can be made from any material such as metal, plastic or leather which will provide adequate rigidity to compress the seal member 44 and protect it from damage.

A spring 46 is next inserted over the extending tube end 40 as shown in FIG. 5. This spring is shown as being helically shaped but other spring configurations could be used which would produce adequate force per unit of deflection to sufficiently compress the seal member 44. The last turn 48 on one end of this spring 46 is reduced in diameter so that an interference fit is formed with the exterior of the extending tube end 40. This reduced turn 48 is positioned away from the washer 45 and clamps the outside of the tube so that the spring is held axially in position on the end 40. The opposite end of the spring 46 has the last coil closed and ground square with the axis of the spring. This presents a relatively uniform flat spring surface to washer 45 through which the spring force is exerted. This clamping action of the reduced turn 48 enables the spring to hold the washer 45 and seal 40 in place on the extending tube end 44 when the female fitting 18 is separated from the male fitting 16.

To complete the assembly the male and female fittings are screwed together so that the extending tube portion 40 is inserted into bore 32 of the male fitting 16 and the extending end of the spring 46 contacts the internal shoulder 35. As the fittings are screwed together the seal 44 is compressed by the force of the spring 46 exerted on the washer 45. This compression of the seal member 44 causes the seal member to be extruded from between the band 42 and the washer 45 to form a seal between the interior surface of the counterbore 34 and the exterior surface of the extending tube end 40. This seal prevents leakage from the extending tube end 40 back through the male fitting 16.

To limit the distance that the female fitting 18 can be screwed onto the male fitting 16, an annular stop 38 is provided on the male member. This stop 38 contacts the outer radial surface 29 on the female member 18 and limits the relative axial movement of the two fittings. It should also be understood that although the fittings are shown as being held together by mating threaded portions, other arrangements could be used such as snap type fittings.

In FIG. 6 an alternate embodiment of the present coupling is shown attached to the suspension element 14. This embodiment differs from the embodiment shown in FIGS. 1 through 5 in the manner in which the fittings are held together. In this embodiment the fittings are held together by a snap type fitting than mating screw threads. As can be seen in FIG. 6, the reinforcement member 41, metal band 42, seal member 44, washer 45 and spring 46 can be identical to those used in the previous embodiment and are assembled in the manner described above. The major difference lies in the shape of the new male and female fittings 56 and 58, respectively.

The exterior of the male fitting 56 is provided with a radial shoulder 60 which extends completely around its exterior. This fitting 56 is provided with a bore, counterbore and internal shoulder 35 which are similar to fitting 16. At the rear end of this fitting 56 is an annular stop or shoulder 62 which is similar to the one on the fitting 16. The fitting is also provided with a portion 66 which extends axially away from the shoulder 62. This extension can be used to position the fitting when it is welded to the suspension element 14 by inserting the extension into an opening in the element.

The female fitting 58 is also substantially similar to the fitting 18 except that a locking shoulder 68 is provided on the inside of the counterbore and is such a size as to engage the radial shoulder 60, when the female fitting 58 is inserted over the male fitting 56. This engagement of the two shoulders provides the force which holds the fitting together and this engagement can be released by prying locking shoulder 68 radially away from the shoulder 60.

It can be seen from the above descriptions that the seal of the present invention is held in sealing contact by the action of a spring so that the coupling retains an effective seal even though the position of the various parts of the coupling translate with respect to each other during extreme environmental conditions.

It can also be seen that when the coupling is used in a pressurized system, the pressure of the fluid acts on the seal and assists the spring in further compressing the seal so that as the pressure in the system is increased, the effectiveness of the seal is improved due to additional compression thereof caused by the increased pressure.

It can also be seen that due to the seal being spring loaded, the various parts of the coupling need not be made of the same materials or even materials with similar coefficients of thermal expansion. The relative movement of the various parts due to variation in operational temperature have no effect on the sealing ability of the coupling.

Although the male fitting of the present invention is shown as being welded onto the fluid suspension element 14, it is anticipated that male pipe threads could be machined on the end of the male fitting so that the male fitting could be screwed into a suspension element or any other suitable device.

Obviously, many modifications and variations of the present invention are possible in light of the above teaching. It is therefore to be understood, that within the scope of the appended claims, the invention may be practiced otherwise than has been specifically described.

I claim:

1. A coupling for connecting one end of a flexible, hollow circular fluid conduit to a vehicle suspension element, comprising:

an elongated female fitting having a central bore completely therethrough of a size sufficient to allow the insertion of said conduit therethrough, one end of said female fitting having a counterbore therein, an inner radial surface formed in the bottom of said counterbore, said one conduit end being inserted through said bore from said other end so as to extend into said female fitting, a hollow reinforcing means mounted in the hollow center of said conduit adjacent said one conduit end, band means mounted on the outside of said conduit spaced away from said one conduit end for clamping the walls of said conduit against the outside surface of said reinforcing means and for engaging said inner radial surface on said female fitting to limit the movement of said female fitting axially along said conduit in a direction toward said one conduit end, an elongated male fitting having a central bore completely therethrough of a size sufficient to allow the insertion of said conduit therethrough, said male fitting having an outside dimension which would allow said male fitting to be inserted into said counterbore of said female fitting, one end of said fitting having a counterbore, axially aligned with said central bore, said other end of said male fitting having means for attaching said fitting to said suspension element, a circular compressible seal means inserted around the exterior of said conduit, said seal means being positioned between said band means and said one conduit end, a protector means mounted on said conduit and axially slideable along said conduit, said protector means being positioned between said seal and said one conduit end, means for removably attaching said male fitting to said female fitting with said male fitting inserted into said counterbore on said female fitting and said one conduit end inserted into said bore in said male fitting, a helical spring mounted with said one conduit end inserted through said spring and between said protector means and said one conduit end for resiliently urging said protector means axially along said conduit in a direction toward said seal means and for compressing said seal means between said protector means and said band means so that said seal contacts in sealing engagement the exterior surface of said conduit and the interior surface of said counterbore in said male fitting when said male and female fittings are attached together by said attaching means, said spring having one end which is reduced in diameter to resiliently engage a portion of the exterior of said conduit means to retain said seal means, said protector means and said helical spring on said one conduit end when said male and female fittings are not attached together by said attaching means.

2. A coupling as claimed in claim 1 wherein said attachment means comprises mating internal and external threads on said male and female fittings for screwing said fittings together.

3. A coupling as claimed in claim 2 wherein said external threads are located on the exterior of said male fitting and said internal threads are located within the interior of said counterbore on said female fitting.

4. A coupling as claimed in claim 1 wherein stop means are provided for limiting the engagement of said fittings in an axial direction and for limiting the compression of said seal means between said protector means and said band means.

5. A coupling as claimed in claim 4 wherein said stop means comprises a radial extending shoulder on the exterior of said male fitting, an outer radial surface on said female fitting, said outer radial surface engaging said radial shoulder to limit the relative axial engagement of said male and female members.

6. A coupling as claimed in claim 1 wherein said attachment means comprises a snap fitting.

7. A coupling as claimed in claim 1 wherein an internal radial shoulder is formed in the bottom of said counterbore in said male member, said spring being compressed between said internal radial shoulder and said protector means.

* * * * *